Jan. 11, 1955  G. U. BRUMBAUGH  2,699,223
CAB OVER ENGINE VEHICLES
Filed Aug. 7, 1950  4 Sheets-Sheet 2

INVENTOR.
GEORGE U. BRUMBAUGH
BY
ATTORNEY

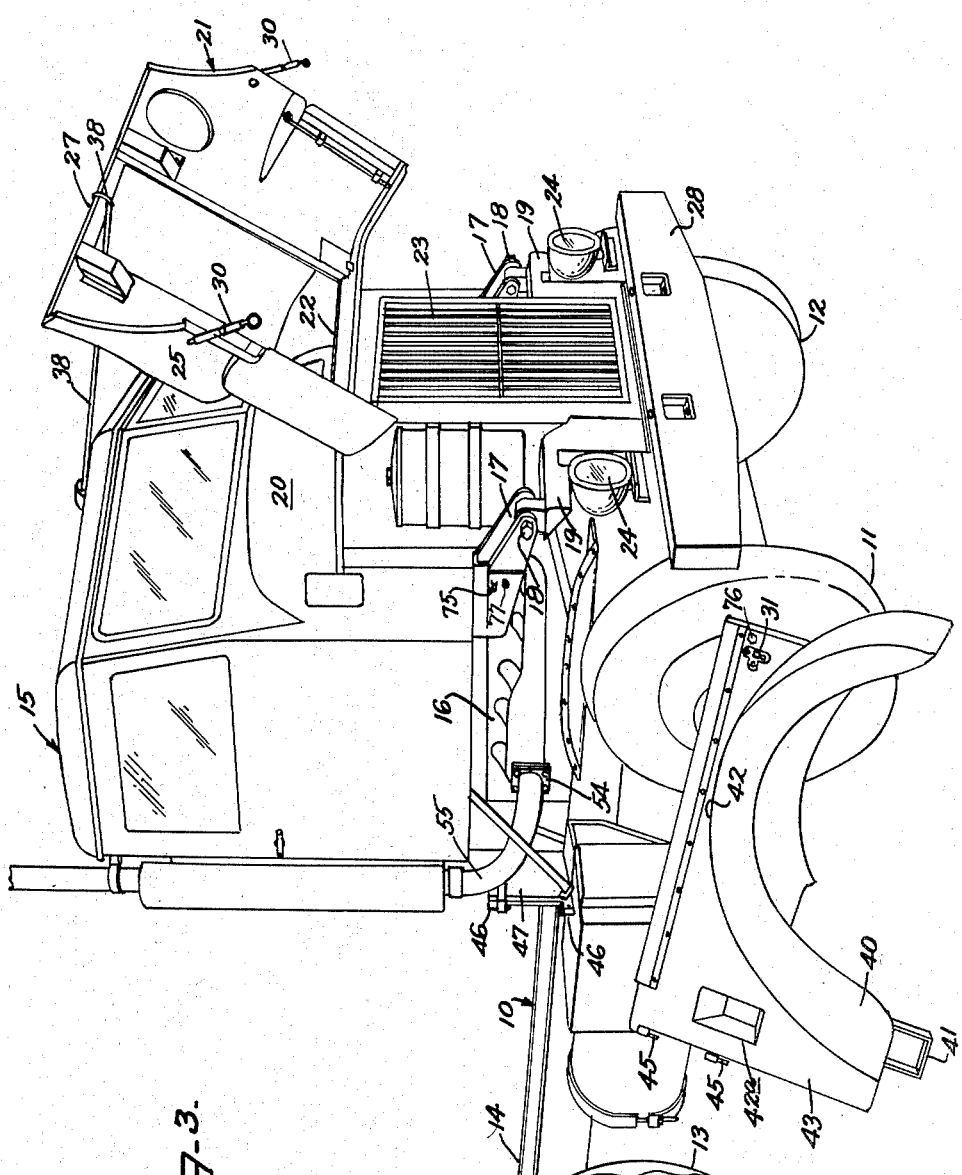

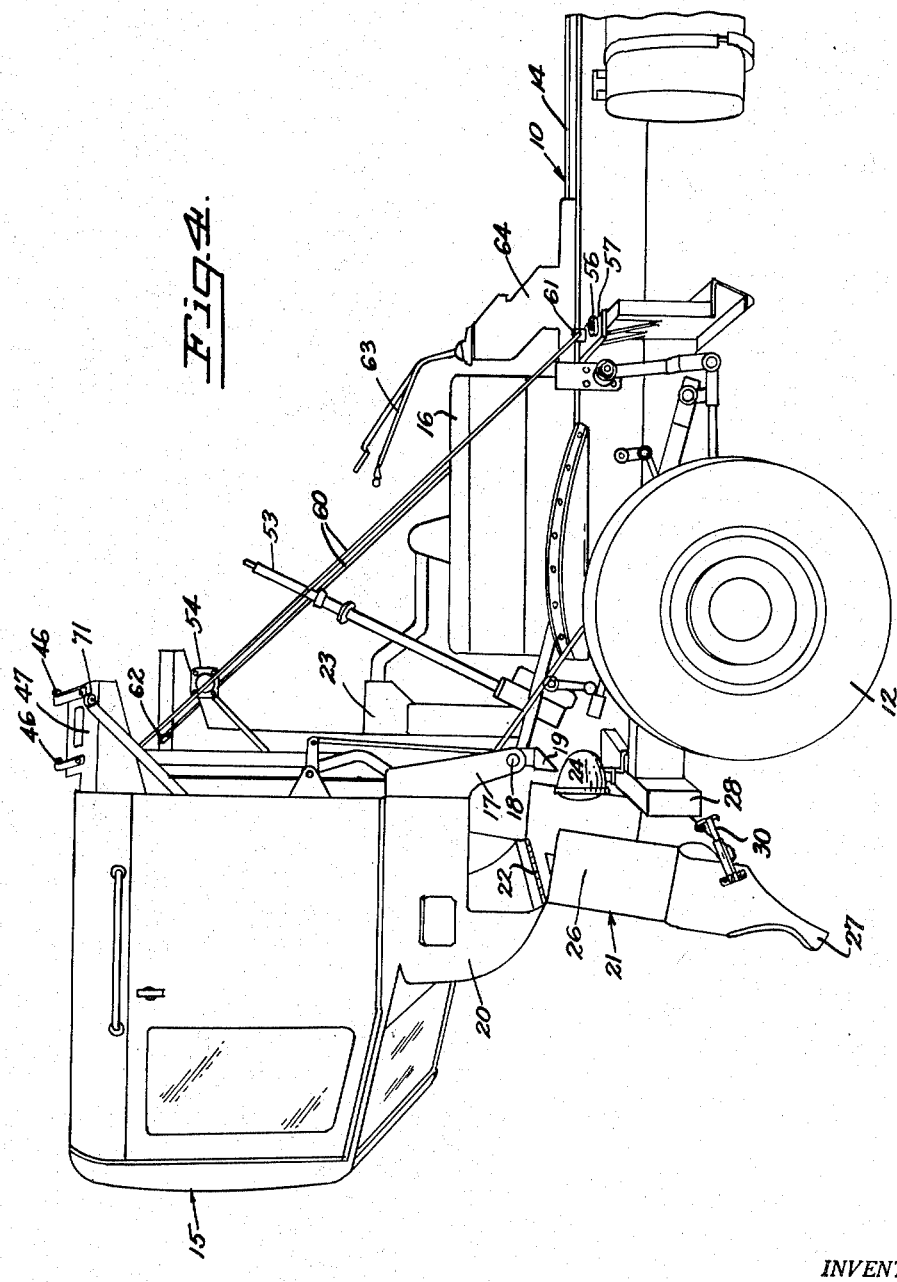

United States Patent Office 2,699,223
Patented Jan. 11, 1955

2,699,223

CAB OVER ENGINE VEHICLE

George U. Brumbaugh, Palo Alto, Calif., assignor to Peterbilt Motors Company, Oakland, Calif., a corporation of California Application August 7, 1950, Serial No. 178,155

7 Claims. (Cl. 180—89)

This invention relates to an improved truck of the cab-over-engine type. Such trucks have become popular for several reasons. One reason is that by minimizing the space taken by the cab and power plant it is possible to have a longer body on a truck with the same over-all length, or in the case of a tractor and trailer combination, it makes possible longer trailer units within the lawful over-all length.

This invention is an improvement in several ways on the cab-over-engine trucks heretofore known and solves several problems that have long caused difficulties in such trucks.

For example, in those trucks whose cabs have heretofore tilted forward over the engine, the engines were practically inaccessible except when the entire cab was tilted forward, and even then there were obstructions which interfered with access by the mechanic. This problem has been solved herein by having the cab high on the chassis so that it is above the engine, by providing a compound hood with a front portion that swings up to give access to the front of the truck engine without moving the cab, and by providing front fenders which comprise the whole side closure below the cab base and are mounted at their rear end on a vertical axis so each fender can swing out of the way and give full access to the engine from each side. In addition, the fenders may be completely removed as soon as they are swung out from under the edge of the cab base. Also by having the cab over the engine the top of each fender forms the running board or step at the cab edge when the cab door is opened.

An advantage of having the cab above the engine, rather than enveloping the engine is that the engine heat and engine noise can be carried away in all horizontal directions and exists on a level below the cab where there is free flow of cooling air and dissipation of noise rather than being confined in a tunnel in the cab.

Another advantage of the present invention is that by pivoting the front portion of the hood along a horizontal axis that is above and forward of the axis upon which the cab tilts the whole structure is braced against accidental forward tilting. The lower edge of the front hood portion rests on or close to the bumper so that the cab is braced against any accidental forward tilting.

Another advantage in having the cab high on the chassis is that the pivoted side fenders can nest in under the sides of the cab when in normal position, thereby locking the fenders so they cannot jar loose from their vertical pivots under rough driving conditions, and yet the instant a fender is moved out from under the cab base it can be lifted out of its hinges and set to one side to expose the whole side of the engine.

Other objects and advantages of the invention will appear from the following description of a preferred form in accordance with United States Revised Statutes, Section 4888. This preferred form is described in detail and is shown in the drawings. However, it is not intended to limit the invention narrowly to the truck thus shown and described, because equivalents are included in the structure defined in the appended claims.

In the drawings:

Fig. 1 is a view in perspective showing a truck embodying the present invention looking toward the front and right side at an angle of about 45 degrees. The cab, hood, and fenders are shown in the position which they normally occupy when the truck is on the road.

Fig. 2 is a view in elevation looking toward the front and left side. A portion of the compound hood is shown partially elevated after being swung up around its horizontal pivot so that there is access to the front part of the engine. One of the front fenders is shown swung aside on its vertical pivot so that there is access to the engine from the side.

Fig. 3 is a view in elevation of the front portion of the truck taken from a point near the viewpoint of Fig. 1 with the swinging hood portion raised still further to give access to additional front parts of the engine and with the left fender completely removed from its pivots and set on the ground beside the truck.

Fig. 4 is a view in side elevation of the front portion of the truck, showing the cab supported in its forward tilted position by suitable guy wires. The fenders also have been removed and the engine is open for free access by a mechanic.

Figure 1:
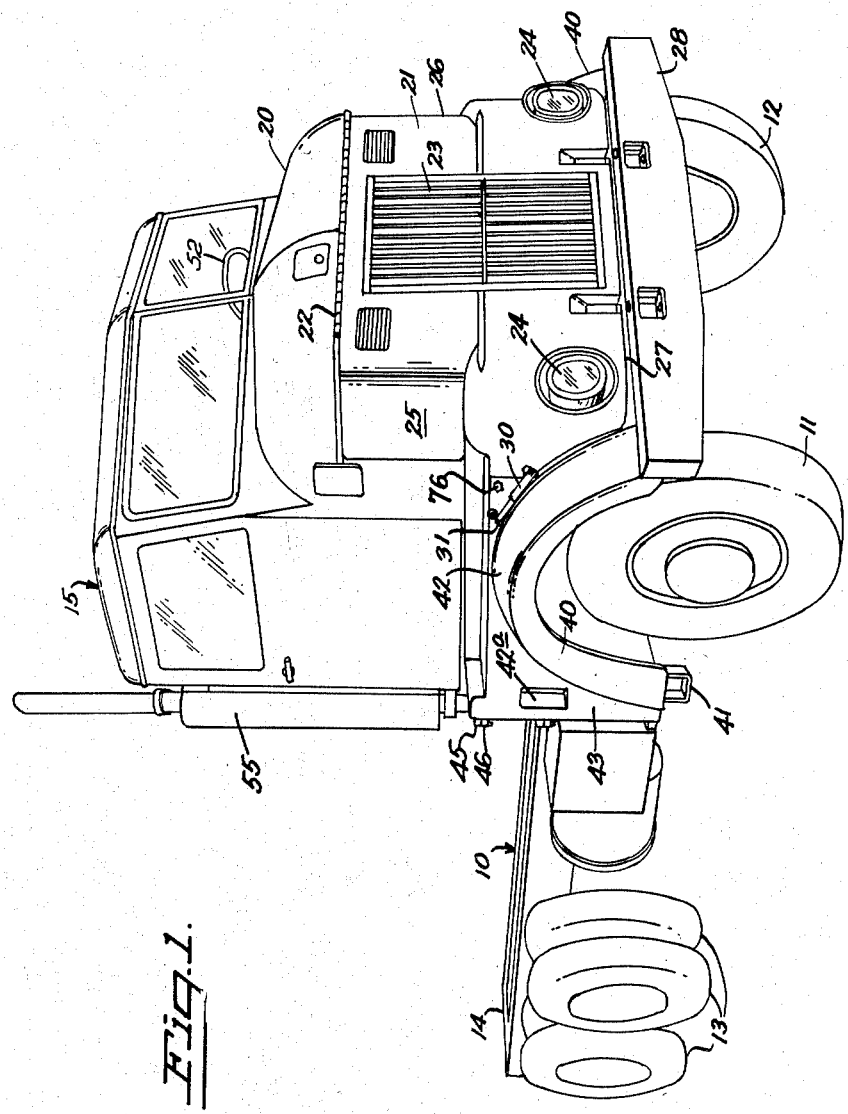

This invention comprises a truck with a cab located above the engine and pivoted near its front end for movement around a horizontal axis. The whole cab can be tilted forwardly to uncover the engine. The cab is also provided with a front hood portion that is pivoted to the cab on a horizontal axis higher than and somewhat forward of the axis upon which the cab tilts. To open the hood the front portion is first swung forward to clear the bumper. The two front fenders are pivoted at their rear ends on a vertical axis, so as to swing out away from the engine. They are supported on vertical pins so they may be removed completely from the truck. The fenders and the cab comprise the entire front body of the truck. Because the cab is high on the chassis above the engine, the sides of the engine are accessible when the fenders are swung out or removed. It is not necessary to tilt the cab forward unless the engine is to be removed, because the cab does not envelop the engine.

The truck shown to illustrate this invention comprises a frame 10 supported on front wheels 11 and 12 and rear wheels 13. The rear portion 14 of the frame 10 supports a truck body or a trailer fifth wheel mounting. A cab 15 is positioned directly above the engine 16 mounted in the frame 10 between the front wheels 11 and 12. The cab 15 includes the doors, top, windshield, and hood, and together with the separate fenders 40 constitutes the whole enclosure for the front end of the truck. The floor of the cab is substantially on a level with the top of the engine. The cab 15 has two brackets 17, one at each forward side and these are mounted for forward tilting movement about two horizontal pins 18 that are journaled in the frame-supported brackets 19.

The hood of the cab is compound in the sense that it is composed of more than one part. The main portion 20 is a rigid integral portion of the cab 15. The front portion 21 is pivoted at its upper edge to the front of the cab 15 along a horizontal pintle 22 which is forward of and above the main pivots 18. The front hood portion 21, when in normal position for driving as in Fig. 1, encloses the radiator 23 and the headlight bodies 24. Its curved sides 25 and 26 extend around the side almost as far back as does the hood portion 20. Its lower end 27 rests on or is closely adjacent the bumper and cross frame member 28. Spring clamps 30 hold the front hood portion 21 to the lugs 31 on each fender 40. These could each be secured to the frame or some other common part.

Figure 2:
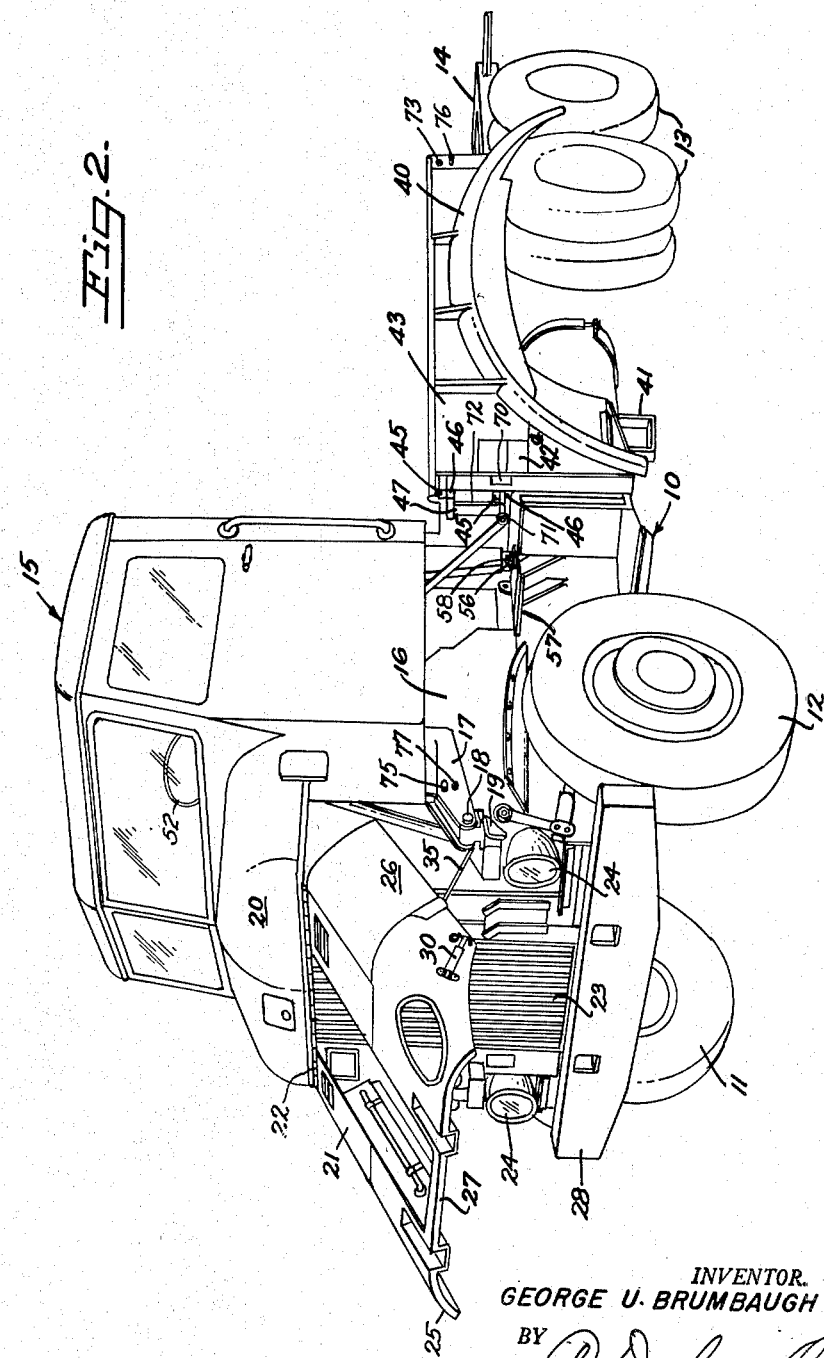

When the front hood portion 21 is swung upwardly, as shown in Fig. 2, access may be had to the front of the engine 16. To do this it is only necessary to unfasten the clamps 30 from the lugs 31 and move the hood portion 21 forward, where it will be held in the position shown in Fig. 2 by a suitable brace 35 that extends to the frame bracket 19. This position gives adequate clearance for work on the radiator, the headlights, the air cleaner, electrical connections, air brake valve, etc.

The front hood portion 21 can be raised higher to the position shown in Fig. 3, to permit access to the upper portions of the front part of the engine 16, and radiator. It may be held in this position by a rope 38 or guy wire anchored to the top of the cab 15, or other suitable braces may be provided.

The front fenders 40 include a stirrup 41, a step 42, a recessed step 42a, and a side body portion 43. The two fender units 40 and the cab 15 comprise the whole side body and enclosure for the forward end of the truck. The fenders 40 are pivoted for side swinging movement about a vertical axis on two supporting pins 45 (see Fig. 3) which slide vertically in and out of the bearings 46 carried on a depending bracket 47 at the rear back end of the cab 15. Each fender is provided with an inclined cam face 70 near its hinge line which bears against a rubber covered roller 71 secured on a vertically adjustable arm 72 so that when the fender is closed in against the side of the cab, the rubber roller and cam are in engagement and serve both to lock the fender hinge against separation and to prevent the parts from rattling. Each fender 40 can be swung to one side and it can be lifted off to give more complete access to the engine 16. When in nested position under the cab side each fender 40 is further held against vertical movement because it comes in under the bottom edge of the cab frame and also because a hole 73 in the fender engages a dowel 75 in the cab frame and a cap screw 76 is threaded into a threaded hole 77 in the cab frame. The front hood portion is held by the catch 30 that engages the lug 31 on the front end of the fender. This secures the fenders 40 and hood 21 to each other in the event the cap screw 76 is not tightened.

Because the cab is high on the frame, when a fender 40 is swung to the side, as in Fig. 2, the whole side of the engine 16 is uncovered. Fig. 2 gives an idea of the unobstructed access to the engine and the steering mechanism possible when the fender 40 is swung out. This view also gives a good idea of the open space below the cab floor for air to circulate around the engine to carry away the heat and for the engine noise to be dissipated.

For normal maintenance and minor repairs moving the front hood section 21, the center floorboards, and the fenders 40 provide all the access needed. When the truck engine is to have a general overhaul, the cab 15 may be tilted forward. As shown in Fig. 4, when this is necessary it may be done quite easily. First the hood catches 30 are disconnected from the fender lugs 31 and the cap screws 76 are removed. Then each fender 40 is swung out to one side and removed by lifting its pins 45 out of the bearings 46. If desired for any reason, the fenders may be left in place on the cab and they will swing upwardly with it. The front hood section 21 is swung out enough to clear the bumper 28. The next step is to remove the steering wheel 52 from the steering column 53 and to take out the left hand seat and floorboard to give clearance past the steering column which remains undisturbed. The exhaust flange connection 54 is unbolted, if the truck is of the type having an exhaust system 55 attached to the cab.

Adjacent the rear end of the cab 15, pads 56 rest on and are bolted to the frame extensions 57. Bolts 58 secure these parts and when they are removed the cab 15 is free to swing forward about the pivots 18. Other types of connections may, of course, be used, but these serve to illustrate one useful structure.

The cab 15 may be tilted easily into its forward position by two men or by a light block and tackle applied near its rear edge. A pair of guy wires 60 are shown in Fig. 4 connected to an eye 61 on the frame 10 and to an eye 62 on the cab. One or the other of these guy wires may be removed when working around the engine. As shown in Fig. 4, the cab is held at about a 90 degree forward tilt to its normal position and is forward of the radiator giving full access to all parts of the power plant.

An advantage of this construction is that the steering column 53 may be left in place and no steering connections are severed. This removes any chance that a mechanic might overlook the proper restoration of steering connections on reassembly. This is in contrast to many of the other types of forward tilting cabs heretofore in use where the steering mechanism has to be disconnected. It will also be noted from Fig. 4 that the levers 63 which control the transmission slope forwardly up from the transmission box 64, which is directly behind the engine 16 and aft of the cab 15. This clears these levers when the cab 15 is swung forward.

It will be seen that when the cab 15 is in place and the truck is made ready for the road, the front hood portion 21 and the fenders 40 are held together by the clamps 30 and the cap screws 76, so that none of them can swing out accidentally. Moreover, the hood 21 is pivoted along the horizontal axis 22 forward of and higher than the tilting axis 18 of the cab 15. This means that should the bolts 58 be loose or out of their place, the cab 15 can rock forward only the amount of clearance between the lower end 27 of the hood 21 and the bumper 28, and in no case can this be enough to cause injury to the driver or damage to the truck.

I claim:

1. A self-propelled wheel-mounted vehicle including a frame; an engine mounted on said frame generally above and between the front wheels; a bumper member extending across the front end of said frame; a cab above said engine, said cab being mounted pivotally to said frame adjacent its front end so that it can be tilted forwardly about a horizontal axis; releasable means for holding said cab rigidly to said frame; a hood comprising a top portion rigid with the cab and a front portion, a horizontal hinge means secured to the front end of said top portion and to said front portion by means of which the latter is pivotally supported forward of and higher than the pivot about which said cab tilts, said front hood portion having its lower end positioned above and closely adjacent said bumper; and clamp means for releasably securing said front hood portion to said cab.

2. A self-propelled wheel-mounted vehicle including a frame; an engine mounted on said frame generally above and between the front wheels; a bumper member extending across the front end of said frame; a cab above said engine, said cab being mounted pivotally to said frame adjacent its front end so that it can be tilted forwardly about a horizontal axis; releasable means for holding said cab rigidly to said frame; a front hood portion, a horizontal hinge means secured to the front end of said cab and to said hood portion by which the latter is pivotally supported forward of and higher than the pivot about which said cab tilts, said front hood portion having its lower end positioned above and closely adjacent said bumper; a pair of fenders at each side each having vertical hinge means, cooperating vertical hinge means secured to each side of said cab adjacent the rear end thereof, each said hinge means being separable by lifting its related fender upwardly; and clamp means for releasably securing said front hood portion to said fenders.

3. The device of claim 2 together with means engageable with said fenders and said cab for holding the fenders against vertical movement.

4. A cab above engine wheel-supported truck including in combination a frame with an engine mounted thereon generally above and between the front wheels and with a bumper member extending across the front end of said frame; a cab hingedly mounted on said frame above said engine with a pivotal connection adjacent its front end so that it can be tilted forwardly about a horizontal axis; a front hood portion pivotally secured to the front end of said cab by means of a horizontal hinge, which hinge is located forward of and higher than the pivotal axis about which the cab tilts, and in which the lower end of said hood portion lies adjacent the upper surface of said bumper member so that said hood will engage said bumper and prevent tilting of said cab if said cab tends to move forwardly about its horizontal axis; a pair of fenders, each fender being mounted for swinging movement about a vertical axis; and clamp means for linking said front hood portion and each fender together.

5. A cab-above-engine wheel-supported truck of the type having a frame with an engine mounted thereon and a bumper member secured across its front end, including in combination: a cab normally positioned generally over said engine, being hingedly mounted on said frame with a pivotal connection adjacent its front end so that it can be tilted forwardly about a horizontal axis; a front hood portion hingedly mounted to the front end of said cab by means of a pivotal connection having a horizontal axis located forward of and higher than the pivotal axis about which the cab tilts, the lower end of said hood portion lying directly above and adjacent said bumper so that when said hood is in place, it will engage said bumper and prevent said cab from tilting forwardly about its horizontal axis; a pair of fenders, each fender being mounted pivotally at the side of said cab for swinging movement about a vertical axis; and clamp means secured to said front hood portion and each fender for holding said front hood portion and each fender in place.

6. A wheel-supported truck of the type having its cab located above its engine, which is mounted on the forward part of the truck frame, including in combination: a cab mounted above said engine on said frame by a pivotal connection located along a horizontal axis adjacent said cab's front end so that it can be tilted forwardly about the horizontal axis provided by said connection; a front hood portion mounted on the front end of said cab by means of a pivotal connection located forward of and higher than the pivotal connection about which the cab tilts; and a bumper member secured to said frame adjacent and directly below the lower end of said hood portion when said portion is in closed position so that said hood when in said position will engage said bumper and prevent tilting of said cab if said cab tends to move forwardly about its horizontal axis.

7. The combination with a vehicle frame having a radiator, a bumper, and an engine with a driver's cab mounted thereabove and pivotally secured to said frame for forward tilting about a horizontal axis, of a vertically extending hood portion enclosing the radiator and front of said engine, said hood portion being pivoted to the front of said cab along a horizontal axis located above and forward of the first mentioned horizontal axis on which said cab is pivoted and the lower portion of said hood portion being normally disposed immediately above said bumper so that said hood portion when down will help prevent said cab from accidentally tipping forwardly, by said hood portion engaging said bumper when such tipping tends to occur, and said hood portion when swung up will give access to the engine beneath said cab without tilting said cab.

References Cited in the file of this patent

UNITED STATES PATENTS

| Number | Name | Date |
|---|---|---|
| 1,795,208 | Garner | Mar. 3, 1931 |
| 2,044,610 | Herreshoff | June 16, 1936 |
| 2,148,308 | Spear | Feb. 21, 1939 |
| 2,151,229 | Piroumoff | Mar. 21, 1939 |
| 2,362,453 | Cooper | Nov. 14, 1944 |
| 2,413,792 | Sharp | Jan. 7, 1947 |